Oct. 26, 1965   C. E. McMANAMA   3,213,904
SETTING DOG FOR PORTABLE BAND SAW
Filed Sept. 21, 1961
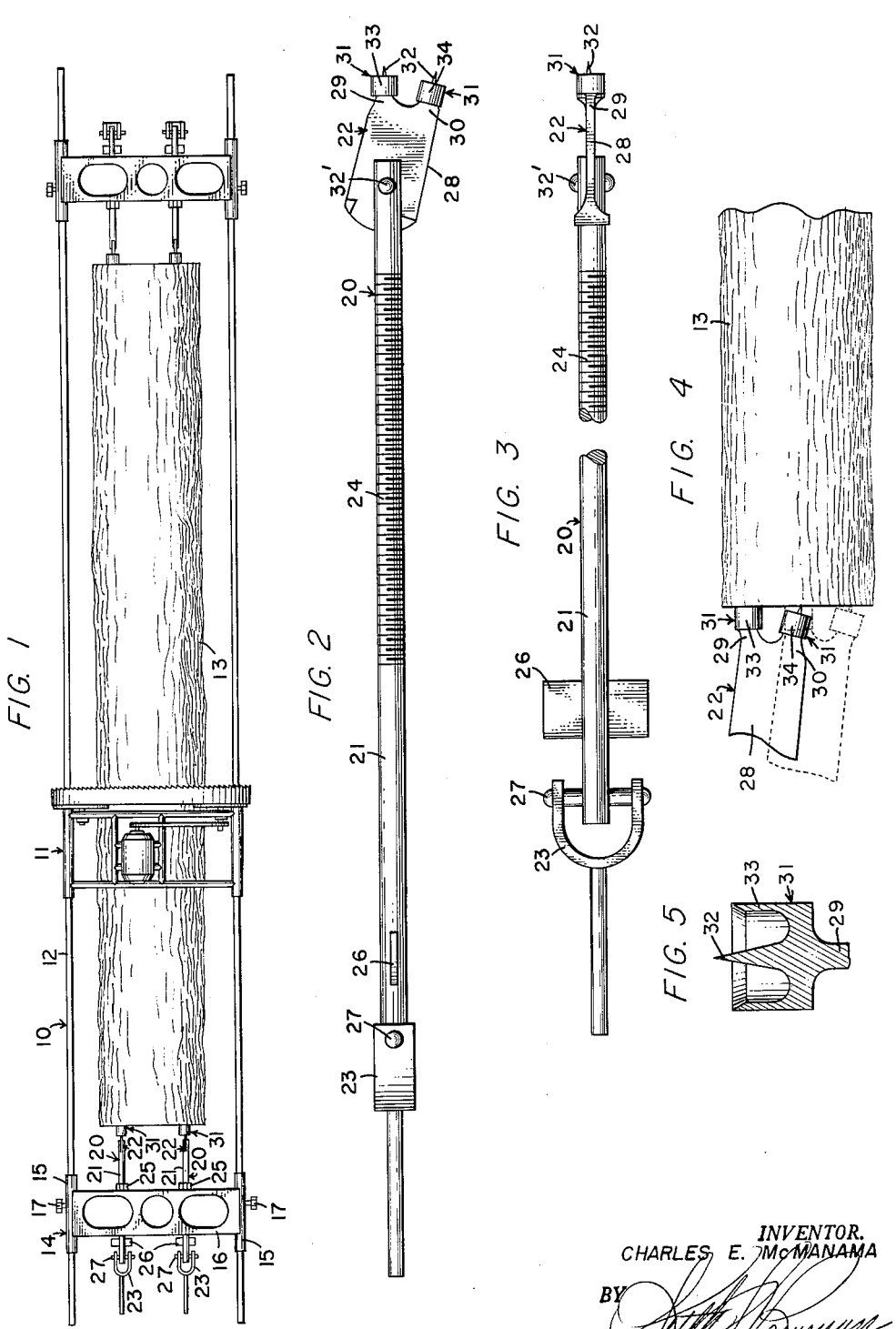

United States Patent Office 3,213,904
Patented Oct. 26, 1965

3,213,904
SETTING DOG FOR PORTABLE BAND SAW
Charles E. McManama, Potlach, Idaho
Filed Sept. 21, 1961, Ser. No. 139,706
2 Claims. (Cl. 143—19)

My invention relates generally to a new and useful setting dog for use with a portable traversing bandsaw machine of the type described in my co-pending application, Serial Number 26,877, filed in the United States Patent Office on the 4th day of May, 1960, now Patent No. 3,115,909. More particularly, the invention relates to a setting dog for use with such a bandsaw traversing on a fixed carriage, supported upon the log being sawed, which permits boards of predetermined thickness to be cut from said log.

In the lumbering industry oftentimes in the case of small lumbering operations and in situations where timber is greatly scattered it has become desirable to use a portable bandsaw with which to cut boards from a log in the forest at or near the place it is fallen. This invention relates to such saws that move on a track carried by a rectangular frame supported directly by the log being sawed into boards. Such a device is set forth in my aforesaid co-pending application for Letters Patent.

In the use of such a portable saw, it is practical to regulate the position of the rectangular guide rail frame upon the log being sawed so as to determine the thickness of the board cut and that this positioning may be varied as desired. It is the purpose of the instant invention to provide such a device that adjustably locates the saw frame upon the log being sawed so that boards of a desired practical thickness may be cut therefrom.

It is the object of my present invention to provide a setting dog of the nature aforesaid that will locate and position the frame of a portable bandsaw upon a log being sawed in an adjustable fashion so that boards of a uniform, predetermined thickness may be cut therefrom, also accommodating logs of various lengths.

For further comprehension of my invention and the objects and advantages thereof, reference is now made to the following specification and the accompanying drawings and appended claims, wherein the various novel features of the invention are most particularly set forth.

In the accompanying drawings which form a part of this specification, and in which like numbers of reference refer to similar parts throughout;

FIGURE 1 is a top or plan view of a portable bandsaw in place upon a log to be sawed, with my setting dogs supporting the saw frame thereon.

FIGURE 2 is a vertical surface view of my mechanical setting dog device.

FIGURE 3 is a horizontal view of the setting dog device of FIGURE 2 with a portion of the central body cut away.

FIGURE 4 is an enlarged partial vertical view of my device in position on the end of a log, illustrating the fashion in which position is changed thereby.

FIGURE 5 is an enlarged view of the log engaging portion of my setting dog.

Referring now to the drawings in more detail, and particularly to FIGURE 1 thereof, a plan view of a portable bandsaw will be seen. The numeral 10 designates the saw frame generally, which carries the bandsaw carriage 11 upon the side rails 12. The side rails 12 of the saw frame 10 are structurally joined and supported by means of the setting dog carriage 14, which should be of such size as to accommodate various size logs 13.

The setting dog carriage designated generally by 14 is composed of the side member 15, adapted to be slidably carried upon the side rails 12 of the saw frame 10, rigidly connected by the cross piece 16. The side members 15 of the setting carriage 14 are provided with threaded holes (not shown) with bolts 17 therein, adapted to adjustably fasten the setting carriage 14 in a predetermined position upon the saw frame 10.

The setting dogs designated generally by 20 are rotatably carried by appropriate holes in the cross piece 16 of the setting dog carriage 14. The setting dog proper 20 is best illustrated in the vertical and horizontal views of FIGURES 2 and 3 respectively. The dog 20 comprises a relatively long, cylindrical rod-like body 21, carrying the dogging member 22 at its forward end the pivotably mounted control handle 23 at its rearward portion. The body 21 is provided with threads 24 over its forward half, adapted to receive the nuts 25 which hold the dog 20 in position in the carriage 14. A plate like fin 26 is provided at the rearward portion of the setting dog 20 to allow the member to be fastened on the cross piece 16 with aid of the nuts 25. The handle 23 is pivotably mounted upon the rearward portion of the setting dog 20 by means of the rivet 27, so that the handle will be rotatable about said pivot point.

The forward portion of the setting dog 20 consists of the flat, plate-like member 28, having the upper projection 29 and similar lower projection 30 adapted to allow it to be moved in a rotary fashion. The member 28 is pivotably mounted in an appropriate slot 31 in the forward portion of the body 21 by means of the rivet 32'. The forward portion of the member 28 is provided with two cup-like portions 31 having a centrally projecting point 32' adapted to be positively engaged against the end of a log 13. The rearward portion of member 28 has lugs mounted thereon (as shown in FIGURES 2 and 3) which properly limit the pivoting action of member 28 upon pin 32. Preferably, either cup 33 or 34 will be concentric with the lineal axis of the setting dog proper 20 at either limit of pivoting action.

The positioning of the cups 31 on the forward portion of the member 28 is most critical. The distance between the central projection 32 of the upper cup 33 and the similar projection 37 of the lower cup 34 determines the amount the saw frame 10 will be lowered when changing from one cup 33 to the other 34, and therefore the thickness of the board that will be cut on each adjustment. The spacial relationship of the two cups 33, 34 is also critical, in that the cup 33 must be directly above the cup 34 so that the frame 10 will travel directly downward. The cups 33 and 34 must be so positioned and proportioned that when the upper cup is imbedded in log 13 as shown in FIGURE 4, it will not become fully disengaged before the lower cup becomes fully engaged during the change cycle—preventing the possibility of slippage along the end of the log 13.

The setting dogs 20 of my device are carried in appropriate holes in the cross pieces 16 of the carriage 14 in a position as shown in the illustration of FIGURE 1. The nuts 25 provide a means of tightening the setting dogs 20 against the end of a log 13 upon which they are to be carried.

To use my invention the various parts are assembled, as illustrated in FIGURE 1, the saw frame 10 positioned over the log 13 to be sawed and the setting dog carriage 14 positioned on the saw frame carriage 10 so that the cups 31 of the setting dogs 20 are very nearly against the opposite ends of the log 13. The setting dogs 20 are then tightened against the ends of the log 13 by means of the nuts 25 until they are implanted in the ends of the log 13 sufficiently to hold the saw frame carriage 10 thereon. A pass is then made with the saw carriage 11 and the first slab taken from the log 13.

To illustrate the setting change cycle for successive cuts, after each dog 20 is rotated 180° on its axis from which position the lower cup has been in engagement and by virtue of said rotation becomes the upper cup as shown in FIGURE 2 and FIGURE 4 as cup 33, the saw frame 10 is then in position to be lowered upon the log in the function of setting. In this position, when engaged cup 33 is uppermost as in FIGURE 4, manual downward pressure assisted by gravity causes each cup 33 to pivot from its engagement at the end of the log and causes each lower cup 34 to become engaged. After this cycle or a repeated number of cycles, depending upon the desired thickness of the board to be sawed, the machine is in proper setting that a board may be sawed from the log. After the cut is completed, the process may be repeated and successive boards may be sawed.

If it be desired to saw thicker boards, by established practice they will be generally a multiple of the unit thickness, and to do this the dogs may be adjusted through as many cycles as unit thicknesses in the board desired to be sawed, with a saw pass being made only after the complete cycle adjustment.

Although the foregoing description is necessarily of a detailed specific character in order that a specific embodiment of my invention may be set forth, it is to be understood that this specific terminology and structure is not intended to be restrictive or confining and that various rearrangements of parts and modifications of detail may be resorted to without departing from the essence, scope or spirit of the invention herein set forth.

Having thusly described my invention, what I desire to protect by Letters Patent, and,

What I claim is:

1. In a portable band saw machine having a rectangular guide rail frame adapted to surround a log, a pair of laterally spaced side rails, crossmembers rigidly connecting said side rails adjacent the opposite ends thereof respectively, and a saw slidably mounted upon said side rails; means adjustably connecting said cross members to said side rails in a manner to accommodate logs of greatly differing lengths, paired rod-like structures independently mounted and adjusted in each of said cross members in laterally spaced guides and extendable toward the log, and means carried upon the ends of the rod-like structures to engage each end of the log adjustably supporting the entire machine upon the log, while in engagement to saw desired thicknesses of lumber therefrom.

2. A mechanism as described in claim 1, each rod-like structure thereof including a rearward extending portion carrying a handle at its end, a central portion rotatably received in one of said laterally spaced guides and a forward portion, a member having two spaced apart sharpened cup-like end portions adapted to engage the log mounted for limited pivoted movement on the forward ends of the rod-like structures about an axis transverse to the rod-like structure between two positions where when one cup-like portion is fully engaged the other is fully disengaged, said cup-like portions having sharpened protruding centers, said members on the forward end of said rod-like structures pivotable from one position to the other following a 180 degree rotation of the rod-like structures and resulting in progressive measured movement upon the log.

References Cited by the Examiner

UNITED STATES PATENTS

| 905,265 | 12/08 | Wise | 143—150 |
| 2,673,581 | 3/54 | Dornath et al. | 143—117 X |

FOREIGN PATENTS 904,386  2/45  France.

WILLIAM W. DYER, Jr., *Primary Examiner.*

WALTER A. SCHEEL, DONALD R. SCHRAN,
*Examiners.*